UNITED STATES PATENT OFFICE.

FRANK OTTO, OF COLUMBUS, OHIO.

SUBSTITUTE FOR COFFEE.

967,425.　　　　　Specification of Letters Patent.　　Patented Aug. 16, 1910.

No Drawing.　　　Application filed August 30, 1909.　Serial No. 515,124.

*To all whom it may concern:*

Be it known that I, FRANK OTTO, a citizen of the United States, residing at Columbus, in the county of Franklin and State of Ohio, have invented a certain new and useful Improvement in Substitutes for Coffee, of which the following is a specification.

The object of this invention is to provide a material adapted as a substitute for coffee, that shall possess substantially the color, taste and aroma of true coffee, but can be used without some of the uncomfortable effects of true coffee.

My invention or discovery is embodied in a composition of substantially equal portions each by volume of figs, wheat and barley prepared substantially as herein set forth.

In the preparation and compounding of these ingredients, the figs are first thoroughly dried in an oven and the wheat and barley are each separately cooked by boiling them in water for about five minutes. The water of this cooking is drained off and the grain afterward thoroughly dried and toasted. This cooking of the grain removes a raw, harsh, grainy taste that would otherwise be imparted to the decoction. After the ingredients are thus dried and toasted each is ground to a fine powder and all are thoroughly mixed together. The resultant mixture is of a dry freely absorbent form, closely resembling fine ground coffee and without the pasty, tacky character usual in coffee substitutes containing figs.

The preparation of the beverage from the compound is substantially the same as that pursued in making the ordinary decoction of true coffee, that is to say, the compound is either boiled in water, or boiled water is poured into it while in a percolator and allowed to drip after the manner of the French. I find that about a teaspoonful of the compound for each half pint of water makes a decoction of average strength, but this can be varied to suit the taste of the user. The beverage produced with this compound resembles and possesses in such a remarkable degree, the agreeable taste, color and aroma of true coffee, as to be difficultly distinguishable from it. Moreover, the ingredients furnish to the decoction a large measure of nourishing and wholesome material, the ingestion of which is not followed by headaches or other annoying symptoms that often manifest themselves in those who use the true coffee.

I am aware that coffee substitutes have heretofore been used or proposed in which desiccated figs and corn and malt and rye variously prepared and compounded, but each of such compounds for one reason or another falls short of imparting to the decoction the difficultly describable pleasing characteristics of true coffee. On the other hand I have discovered that the particular compound containing the ingredients herein described and prepared in substantially the manner I have set forth comes nearer to imparting said characteristics.

What I claim is:

A coffee substitute consisting of a compound of equal portions by weight of the following ingredients, towit: first oven-dried and ground figs, second boiled, dried, toasted and ground wheat, and third, boiled, dried, toasted and ground barley, substantially as described.

FRANK OTTO.

Witnesses:
OSCAR OTTO,
BENJAMIN FINCKEL.